Patented July 7, 1936

2,047,150

UNITED STATES PATENT OFFICE 2,047,150

COMPOSITION OF MATTER AND METHOD OF MAKING THE SAME

Walter J. Koenig, Robert H. Pohl, and Robert W. Walker, Philadelphia, Pa.

No Drawing. Application December 7, 1932, Serial No. 646,150

23 Claims. (Cl. 134—26)

This invention relates to a novel composition of matter and the method of making the same, and more particularly to an oleaginous composition including a substance adapted to dry the oil thereof by a resin-forming condensation at elevated temperature and the method of drying such composition.

The present application constitutes an improvement on the broad invention described and claimed in the co-pending application of Koenig, Serial Number 646,148 filed herewith.

In said co-pending application are disclosed the composition and method of drying oils by incorporating therein a resin-forming constituent and reacting it with the oil or other constituent of the vehicle to effect a drying by a resin-forming condensation. As there disclosed, the resin-forming constituent is in general one of those compounds which form resins by condensation, either with similar molecules or with other compounds.

Numerous condensation reactions which result in the formation of resins have already been studied and it is unnecessary to enumerate the hundreds of compounds which may be used in this way. It is to be remembered, however, that the substances which are used according to the present invention are caused to react in situ within the composition and that before the condensation is complete the substance is to form a portion of the vehicle so that it should ordinarily be either a liquid or a semi-liquid or readily miscible in a liquid constituent of the vehicle or capable of intimate dispersion therein, e. g., by grinding like a pigment. It should, of course, be sufficiently soluble in the oil so that the molecules thereof may disperse into the oil and there react with the molecules of the oil. Likewise, the condensation according to the present invention should take place at a temperature which will not injure other constituents of the composition and, advantageously, not at normal atmospheric temperatures. Advantageously, substantially the entire vehicle enters into the reaction, or at least enough so that the vehicle can be solidified by the reaction.

The substances which thus condense with the drying oil to form resins include especially organic oxy-cyclic compounds such as those containing the hydroxyl radical, e. g., alcohols, hydroxy-keto compounds, phenols, etc., those containing the CO group characteristic of ketones, those containing the CHO group characteristic of aldehydes and those containing the OCOCO group characteristic of anhydrides.

By oxy-cyclic compounds we mean true saturated or true unsaturated oxy-heterocyclic compounds, in which the element is oxygen, and true oxy-carbocyclic compounds, having hydroxyl, keto, aldehyde or anhydride groups. By true saturated and true unsaturated oxy-heterocyclic and true oxy-carbocyclic compounds we mean that the compounds consist of hydrogen and carbon atoms and the above named oxy groups. Of course, through this description methyl groups, etc., are included. We also include unsaturated unsubstituted heterocyclic compounds in which the element is oxygen, as such compounds will condense in accordance with the invention and apparently through an unsaturated linkage of the compounds.

Specific examples of such compounds are phenol, cyclo-hexanol, 4 acetyl 1-1 methyl cyclohexanol, 1.2.8.-trihydroxy-hexahydro-p-cymene, di-acetone-alcohol, cyclohexanone, methyl cyclohexanone, aryl-alpha-keto-tetrahydronaphthalene, homoterpenylic-methyl-ketone, furfuraldehyde, phthalic anhydride. This list could be multiplied indefinitely since as is well known, numerous compounds exhibit resin-forming characteristics, i. e., are capable of forming resins by condensation with compounds present in or released from the drying oils. Since the choice of these compounds is no part of the invention claimed in this application, but is fully disclosed and claimed in the said co-pending application of Walter J. Koenig, a more detailed discussion of such compounds and the basis of choosing them will be unnecessary in this application, and reference is made to said co-pending application. It is an object of this invention, particularly, to produce superior compositions of the type described and claimed in said co-pending application. To this end, we have now discovered that novel advantages may be obtained by the addition of fatty acids in the oil, either before or after the initial condensation reaction and before the final resinification of the oil. These fatty acids are preferably similar to those, or some of those, of the oil to which they are added, or of an oil which would be dried by condensation with the resin-forming substance, and since they enter largely into the condensation reaction in the same manner as the fatty acids of the original oil, they may not essentially change the characteristics of the final product nor destroy the advantages secured by condensation of the resin-forming substances with the drying oil. They do, however, tend to hasten the drying action and produce a smoother, more perfect film; and furthermore, when the oleaginous composition is to be dispersed, it is found that the presence of the added fatty acids serves to assist in the dispersion of the oil and to render the resulting emulsion more stable; and where a semi-solid or gelled vehicle is desired, as in the case of linoleum and other plastics, the gelling is more easily attained when fatty acids are thus added.

It was pointed out above that the condensation reaction should take place at a temperature which will not injure the constituents of the composition, and advantageously, not at normal atmospheric temperatures. In brief, when the mixture is heated, the reaction will be activated and the temperature to which the mixture is heated to cause condensation and ultimately drying through condensation, is regarded as an elevated temperature. By the term elevated temperature we mean heating the mixture to a temperature between the limits at which the condensation reaction starts and below the temperature at which the ingredients of the mixture will be destroyed, such as by charring. The elevated temperature to which the mixture must be heated to cause the desired condensation reaction will vary in each case depending on the oxy-cyclic organic compound used.

The following may be given as a specific example to illustrate the best manner of practicing our invention:

Five parts of phenol, by weight, may be added to one hundred parts of raw China-wood oil. This mixture may be heated in a Bedford kettle to a temperature of about 180° F. and blown with rotation of the paddles at about 550 R. P. M. This treatment is continued until the material has attained a viscosity of about ten seconds, measured by the Gardner-Holt bubble tube at 86° F. This ordinarily will take something less than four hours, the time required to attain this viscosity being substantially less than when the oil is bodied without the presence of phenol. At this stage, five parts, by weight, of China-wood oil fatty acids are added and thoroughly mixed with the oil during continued blowing of the oil for three to six minutes, after which the resulting composition may be cooled, or may be emulsified directly by dispersing the oil directly in the aqueous phase. For this purpose, we preferably employ an aqueous phase containing 4% of tri-ethanol-amine as the emulsifying agent and 1% to 6% of casein, or equivalent material, as the stabilizing agent to about 90% of oil to be emulsified. The procedure and apparatus used for the dispersion of the oleaginous composition in the aqueous phase may be the same as have been used prior to our invention.

The clear varnish produced according to the above example, without emulsifying, may be dried at elevated temperatures, preferably about 140° F. to a hard, clear, smooth film in thirty to forty-five minutes, and the emulsion made as above described dries to a smooth and relatively hard film in three hours' time at 140° F.

When this varnish, without water, is mixed with pigments, e. g., by grinding pigments therewith according to the ordinary procedure, it will not dry under such conditions without distortion, e. g., wrinkling or "orange peel". However, when such paint is made into an emulsion by any method well known to the art, a film formed thereof will dry smooth and relatively hard at any superatmospheric temperature. As an example of such a paint, a pigment composition consisting of, for example, 150 parts ground slate may be ground with 87 parts, by weight, of the vehicle made, for example, as described above, and the resulting composition may be dispersed in an aqueous vehicle consisting of

| | Parts |
|---|---|
| Water | 80 |
| Tri-ethanol-amine | 3 |
| Southern clay | 60 |
| Ammoniacal casein solution | 5 | in the proportion of 237 parts of the dispersed paint to 148 parts of the aqueous continuous phase. This film is superior to comparable films prepared from oils which have not been treated with phenol in surface appearance, in flexibility, in permanence, and in many other respects.

The varnish made with added fatty acids, as above described, will be found to form a much more stable emulsion than would be possible without the use of additional fatty acids, e. g., compositions such as the preferred example set forth in the co-pending application of Koenig, Serial Number 646,148 filed herewith.

Although even relatively small additions of free fatty acids, together with a corresponding excess of resin-forming constituent will produce an improved result for many purposes, there are certain effects which do not become apparent until larger amounts are used. Thus, as already stated above, the varnish described in the above example will, when compounded with pigments, have a tendency to surface distortion during drying, unless it is dried in the presence of a large amount of water vapor, as in the case of the aqueous emulsion. If, however, the percentage of acid is increased to above 10%, and the percentage of phenol is correspondingly increased, e. g., to approximately 10%, or more, according to the amount of acid, the paint made by use of the same pigments will be found to dry rapidly and without surface distortion, giving a perfectly smooth and highly satisfactory paint. The amount of acids thus used may be increased with advantage to as high as 40%, and the amount of phenol correspondingly increased, e. g., to approximately 30%. Even higher proportions may be used, but thus far we have not found further increase to give proportional advantage. When higher proportions of phenol and fatty acid are used, all ingredients should be charged together at the start of the blowing operation. When alkali resistance is important, such high proportions of acid should not be used, as we have found that alkali resistance is greater as the acid number of the vehicle approaches zero.

There is important advantage in the composition of phenol and drying oil produced as described above, and this advantage may be attained to some extent even without the additional fatty acids. It will be found, however, that a better and quicker drying film will be produced by a paint or varnish made by the addition of substantial amounts of fatty acids and a corresponding excess of phenol, especially when the acid is blown for at least a short time.

Other phenols may be used, including cresol, xylenol, naphthol, etc., and the advantages from the use of added fatty acids may be attained with the various other resin-forming substances such as are disclosed in the co-pending application of Koenig. Where the added fatty acids are used, however, we have found the phenol compositions to be the most advantageous.

The proportion of phenol used in the composition may also be varied to a considerable extent, and should depend upon the amount of fatty acid used. If a lesser amount is used, less than the full effect of the invention may be obtained, whereas an excess, within reasonable proportions, does not appear to have objectionable effects, but does not show sufficient improvement to justify its use.

Other drying oils (in which term we include also the so-called semi-drying oils and non-drying oils to which an unsaturated acid similar to the acids of the drying oils has been added, and even such drying oil fatty acids substantially without glycerides), for example, fish oil, linseed oil, and castor oil or soya bean oil to which fatty acids of China wood or linseed oil have been added, may be used similarly to China wood oil. It is our belief that oxidized oils, for the most part, enter the condensation reaction in the practice of this invention. We have also observed that the drying action of these compositions increases with the increased number of double bonds, and that the type of structures, when two or more double bonds are present in the straight chain, also makes a great difference. In such cases, the conjugate double bond structures, such as are present in China wood oil, dry faster and give better products from the standpoint of wear and alkali resistance than the structures having the interposed methylene groupings such as linolic and linolinic acids and glycerides. This also holds true in the addition of fatty acids to the composition, in which case, as would be expected from the above, the unsaturated fatty acids of China wood oil give better results than those of linseed oil.

Even the non-drying oils, however, usually include at least one unsaturated double bond in their chemical structures and, as already indicated above, we regard this double bond as important in the condensation reaction, and, other things being equal, prefer to use the oils having a higher degree of unsaturation.

It has been demonstrated, that unsaturated fatty acids, such as those of the drying oils, are themselves capable of drying with the formation of excellent varnish or paint films, or for use in plastics more or less similar to linoleum plastics and other drying oil compositions. We have now discovered that these fatty acids may be treated according to the present invention by condensation with a suitable resin-forming substance to form highly satisfactory paints, varnishes, plastics, etc., alone as well as combined with drying or non-drying oils. Thus, for example, when China wood oil fatty acids are blown in a Bedford kettle to a heavy body, say for one and one-half hours at 180° F., air pressure one-half pound, the resulting viscosity will be in the neighborhood of 90° Doolittle, and the product thus obtained will dry with a slight tack in twelve hours at 140° F., but at higher temperatures the drying is much faster, and the film is tack-free. If, instead of drying such a product in the air, a composition is made of 100 parts of China wood oil fatty acids and 10 parts of phenol, preferably added before the blowing treatment, the film dries quicker, and forms a much harder and more perfectly satisfactory product than straight fatty acids, as described above. Thus, for example, blowing a mixture of raw acids and phenol for one hour at 220° F., one-half pound air pressure, the resulting product may be dried in three and one-half hours at 220° F. to a clear, tack-free, dark amber film. The viscosity of the product, after the blowing, in this case ranges from 60° to 80° Doolittle. Similar results may be obtained with linseed oil fatty acids. In this case, however, the times required are somewhat longer. For example, a mixture of 10 parts phenol and 100 parts linseed oil fatty acids under the same conditions as specified above required two and one-half hours blowing to attain the same viscosity, and the phenol product requires five hours to dry at 220° F. The resulting film is clear, tack-free and dark amber in color.

We have also found, as mentioned above, that the addition of drying oil fatty acids and organic oxy-compounds to non-drying oils that possess at least one double bond converts them, so far as the purposes of this application are concerned, into drying oils. Thus, for example, a mixture of 20 parts China wood oil fatty acids, 10 parts phenol and 100 parts castor oil, when blown for five hours at 220° F., one-half pound air pressure, will give a product with a viscosity of 60° Doolittle, which will dry clear, smooth, and only slightly tacky, and dark amber in color, in eight hours at 220° F. At a higher temperature, e. g., 250° F., or even higher, the film cures tack-free, its characteristics being otherwise unchanged. Similarly, with soya bean oil, if 20 parts China wood oil fatty acids and 10 parts phenol are added to 100 parts of soya bean oil, and the mixture blown to a high viscosity, say three hours at 220° F., one-half pound air pressure, viscosity 60° Doolittle, the film will dry clear, tack-free, and amber in color in seven hours, at 220° F.

When such free fatty acids are blown with the drying oils, even without the aid of other resin-forming substance the resulting product will dry rapidly at elevated temperature to form a product similar to that of the above examples. The drying in this case also is apparently by a resin-forming condensation rather than by mere oxidation and/or polymerization. Such free fatty acids alone, after suitable blowing, may be dried similarly and with a similar result, but a resin-forming substance as specified above and in the co-pending application of Walter J. Koenig, Serial No. 646,148, should be used with semi-drying or nondrying oils.

Apparently the unsaturated acids of the drying oils, either directly or through their derivative products, serve to promote condensation of the oils. It seems probable that the double bond of the unsaturated acids is in some way responsible for the characteristic results attained by the use of these fatty acids in our invention. It is to be understood, however, that these and any other theories set forth here are proposed only by way of explanation of results already attained, and our invention is in no way dependent upon the correctness of such theories, nor is the scope of this application to be limited thereby.

When the free fatty acids are introduced into the oil without preliminary oxidation, it is preferable to blow the oil for a short time, e. g., as specified in the preferred example given above. The oxidation in this manner seems to give products which are important in the condensation reaction. Thus, for example, as set forth in the co-pending application of Koenig, referred to above, a kettle-bodied oil or a raw oil does not give as satisfactory results when used with the resin-forming constituent as would oil-containing products resulting from a preliminary oxidation treatment. We have found that these desirable products may, to some extent, be introduced into the oil without actual blowing of the oil itself, e. g., by the use of additional fatty acids which have been blown prior to their introduction.

In referring herein to the condensation of the resin-forming substance with the oil, we do not intend to imply that all of the oil enters into the reaction.

In referring herein to a vehicle, we do not intend to be limited to liquid compositions, since our invention is applicable also to plastic compositions, in connection with which, as well as with liquid compositions, we have used the word "vehicle" to describe the composition of our invention. By "oil soluble" I mean a material which is sufficiently soluble in the oil so that molecules thereof can be dispersed in the oil to react with the molecules of the oil.

In the above specification, we have given examples and suggested certain modifications for the purpose of illustrating the invention, and without in any way attempting to exhaustively cover all the various modifications and applications of our invention. Similarly, we have expressed certain theories which we have developed in the course of our investigations and practical experience with this invention which we believe may be helpful to those who subsequently apply and extend the application of our invention. However, we have not as yet tested these theories sufficiently to set them up as certainly correct, and since the invention is in no way dependent upon the correctness of any theory which we have expressed, it is to be understood that the scope of our invention and claims is in no way limited thereby.

We claim:

1. The method of forming a resinous coating which comprises mixing with a drying oil an oxy-cyclic organic compound and a drying oil unsaturated fatty acid, blowing the mixture with air at an elevated temperature until a partial condensation occurs between an oxy-cyclic organic compound and an oleaginous constituent of the mixture, cooling the mixture before the condensation is complete and when a desired body is attained, spreading the resulting material over the surface to be coated, and thereafter heating it to an elevated temperature to renew said condensation reaction and thereby to dry said coating.

2. The method as defined in claim 1 in which the partially condensed material is emulsified in a slightly alkaline aqueous phase before spreading on the surface to be coated.

3. The method as defined in claim 1 in which the mixture is at no time heated for any substantial period to a temperature above about 350° F.

4. The method as defined in claim 1 in which the mixture is at no time heated for any substantial period to a temperature above about 220° F.

5. A composition of matter comprising an oleaginous vehicle including an oil soluble oxy-cyclic organic compound, an oxidized drying oil and oxidized drying oil fatty acids.

6. A composition of matter as defined in claim 5 in which the oxidized drying oil fatty acids have been subjected to a heat treatment under oxidizing conditions.

7. An emulsion comprising an oleaginous disperse phase including an oxidized drying oil, an oil soluble oxy-cyclic organic compound, and oxidized drying oil fatty acids, said mixture of the drying oil, drying oil fatty acids and oxy-cyclic organic compound being condensed at an elevated temperature, and a continuous phase including a dispersing agent.

8. An emulsion as defined in claim 7 in which China wood oil is used as the drying oil, and China wood oil fatty acids as the oxidized fatty acids.

9. An oleaginous composition comprising an oxidized drying oil, drying oil fatty acids not derived from said oil, and an oxy-cyclic organic compound.

10. An emulsion comprising an aqueous continuous phase adapted to be dried by evaporation of water, and an oleaginous disperse phase including oxidized China wood oil, oxidized drying oil fatty acids and an oxy-cyclic organic compound in amount sufficient to dry the oleaginous mixture by condensation at elevated temperature.

11. A composition of matter comprising an oleaginous vehicle including a phenol, an oxidized drying oil and oxidized drying oil fatty acids.

12. The method of making compositions adapted to dry which comprises mixing a drying oil having double bonds in conjugate arrangement, a drying fatty acid and an oxycyclic organic compound, thereafter subjecting the mixture to an oxidation treatment and condensing the mixture at an elevated temperature until the desired viscosity is attained.

13. A composition of matter comprising a vehicle of oxidized soya bean oil, oxidized drying oil fatty acids and an oxy-cyclic organic compound.

14. The method of making a composition adapted to dry at an elevated temperature which comprises mixing oxidized soya bean oil, drying oil fatty acids and an oxy-cyclic organic compound, thereafter subjecting the mixture to an oxidation treatment and condensing the mixture at an elevated temperature until the desired viscosity is attained.

15. A composition of matter comprising a vehicle of oxidized castor oil, oxidized drying oil fatty acids and an oxy-cyclic organic compound.

16. The method of making a composition adapted to dry at an elevated temperature which comprises mixing oxidized castor oil, drying oil fatty acids and an oxy-cyclic organic compound, thereafter subjecting the mixture to an oxidation treatment and condensing the mixture at an elevated temperature until the desired viscosity is attained.

17. The method of drying an oleaginous composition which comprises reacting at elevated temperature a mixture of a drying oil having double bonds in conjugate arrangement, a drying oil fatty acid having double bonds in conjugate arrangement, and an oxy-cyclic organic compound under oxidizing conditions until the desired viscosity is attained to form a partial condensation product in which only a portion of the oil enters the reaction, then dispersing the treated mixture in water to form an emulsion, said emulsion then being dried at an elevated temperature with elimination of water, and a further drying action accelerated by the presence of the condensation product.

18. The method of treating an oleaginous composition which comprises mixing an oxidized fatty acid with a drying oil having double bonds in conjugate arrangement, then adding an oxycyclic organic compound and condensing the organic compound with the mixture at an elevated temperature until the desired viscosity is attained.

19. A composition of matter comprising a condensation mixture in which the condensation reactants consist of oxidized China wood oil and a phenol in amount adapted to dry the oil, substantially without oxidation, by a condensation reaction at an elevated temperature.

20. A composition of matter comprising a condensation mixture in which the condensation reactants consist of oxidized drying oil having double bonds in conjugate arrangement and a phenol in amount to dry the oil by a condensation reaction at an elevated temperature.

21. A composition as defined in claim 20 in which driers are added to the mixture.

22. The method of making a composition adapted to dry at an elevated temperature which comprises mixing a phenol with drying oil having double bonds in conjugate arrangement, oxidizing and condensing the mixture at an elevated temperature, until the desired viscosity is attained, the condensation reactants in said condensation of the mixture consisting of a phenol and drying oil having double bonds in conjugate arrangement.

23. The method of making a composition adapted to dry at an elevated temperature which comprises mixing a phenol with oxidized drying oil having double bonds in conjugate arrangement, heating the mixture to initiate a condensation reaction in which the condensation reactants consist of said oxidized drying oil and the phenol, cooling the mixture when the desired body is attained, thereby retarding the condensation reaction.

WALTER J. KOENIG.
ROBERT H. POHL.
ROBERT W. WALKER.